United States Patent
Yi et al.

(10) Patent No.: US 12,004,144 B2
(45) Date of Patent: Jun. 4, 2024

(54) MULTI-BAND SINGLE MAC COMMUNICATION SYSTEM

(71) Applicant: Huawei Technologies Co., Ltd., Shenzhen (CN)

(72) Inventors: Yongjiang Yi, Union City, CA (US); Tianan Ma, Palo Alto, CA (US); Chusong Xiao, Fremont, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 17/502,687

(22) Filed: Oct. 15, 2021

(65) Prior Publication Data
US 2022/0039104 A1 Feb. 3, 2022

Related U.S. Application Data

(63) Continuation of application No. PCT/US2020/017439, filed on Feb. 10, 2020.

(60) Provisional application No. 62/843,158, filed on May 3, 2019.

(51) Int. Cl.
*H04W 72/12* (2023.01)
*H04W 72/1268* (2023.01)
*H04W 72/1273* (2023.01)

(52) U.S. Cl.
CPC ....... *H04W 72/12* (2013.01); *H04W 72/1268* (2013.01); *H04W 72/1273* (2013.01)

(58) Field of Classification Search
CPC ............. H04W 72/12; H04W 72/1268; H04W 72/1273
See application file for complete search history.

(56) References Cited

U.S. PATENT DOCUMENTS

| 2014/0045478 A1* | 2/2014 | Moshfeghi | H04W 84/00 455/418 |
| 2014/0269461 A1 | 9/2014 | Mehta | |
| 2017/0311204 A1 | 10/2017 | Cariou et al. | |
| 2018/0145919 A1 | 5/2018 | Kalikot Veetil et al. | |

OTHER PUBLICATIONS

Youngsoo, K., et al., "Adaptive two-level frame aggregation in IEEE 802.11n WLAN", 2012 18th Asia-Pacific Conference on Communications (APCC), Oct. 15-17, 2012, 6 Pages, Jeju, Korea (South).

* cited by examiner

*Primary Examiner* — Duc C Ho
(74) *Attorney, Agent, or Firm* — Slater Matsil, LLP

(57) ABSTRACT

A method and apparatus include a communications circuit including a host interface and a processor implemented, unitary media access controller interfacing with each of a first transmit and receive circuitry and a second transmit and receive circuitry. The first transmit and receive circuitry is configured to transmit and receive data over a first operating frequency and the second transmit and receive circuitry is configured to transmit and receive data over a second, different operating frequency band. The method includes scheduling a first portion of the plurality of frames for transmission on a first operating frequency band and scheduling a second portion of the plurality of frames for transmission via a second, different operating frequency band. At least some of the first portion of the frames and the second portion of the plurality of frames are transmitted via the first and the second data channel, respectively, at the same time.

20 Claims, 12 Drawing Sheets

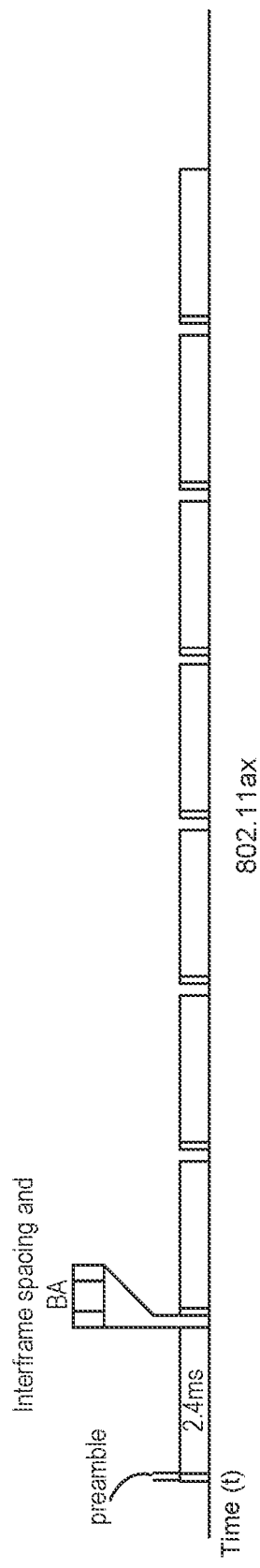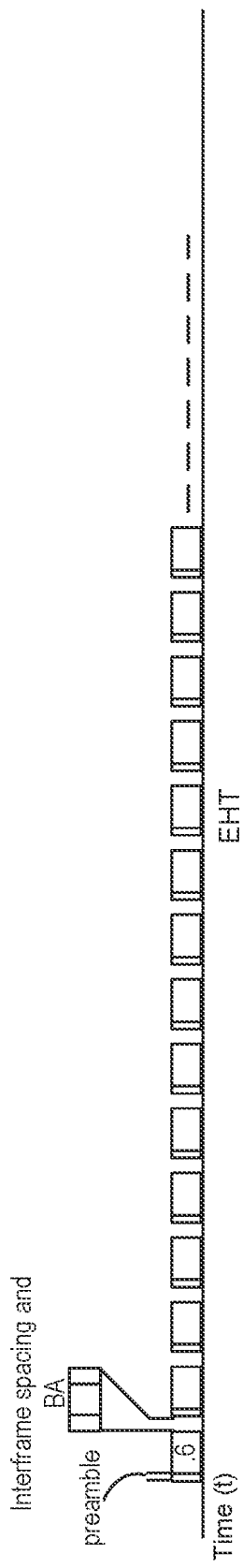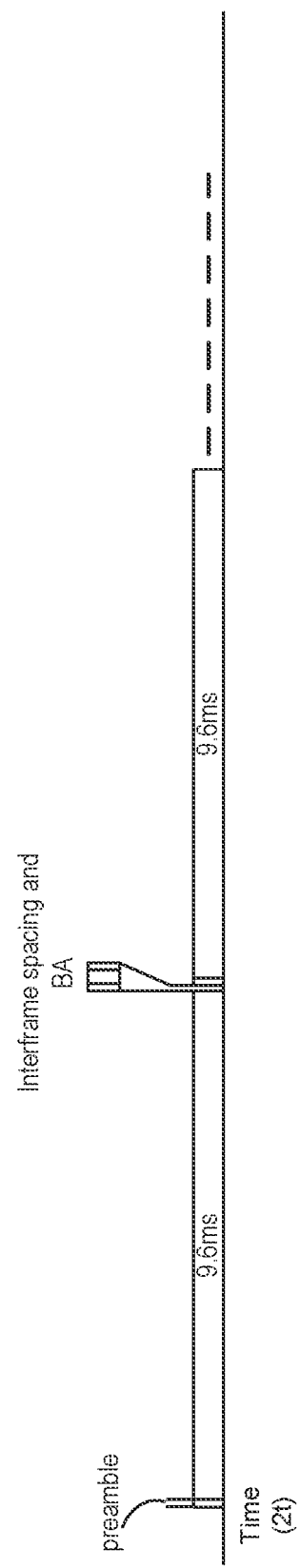
FIG. 15A
FIG. 15B

MULTI-BAND SINGLE MAC COMMUNICATION SYSTEM

CROSS-REFERENCE TO RELATED APPLICATIONS

This application is a continuation of PCT Application Number PCT/US2020/017439 filed on Feb. 10, 2020 which claims the benefit of U.S. Provisional Patent Application No. 62/843,158 filed on May 3, 2019, and 62/931,876 filed May 6, 2019, all of which are hereby incorporated by reference.

TECHNICAL FIELD

The disclosure generally relates to electronic communication and to systems and methods used for electronic communication.

BACKGROUND

Electronic communication, including wireless electronic communication is widely used for a broad range of purposes. Electronic circuits, including electronic circuits formed as integrated circuits (ICs) on semiconductor substrates, may be used in electronic communication systems. For example, mobile phones, laptops, tablets and other user devices may use wireless electronic communication to access a wireless network. In a wireless communication network, user devices (user equipment) may wirelessly connect to an access point or base station, which is connected to a network (e.g. the Internet) and provides network access to user devices.

Each of these types of user equipment benefits from higher bandwidth and higher throughput in electronic communication. In wireless communications, the available communication spectrum is limited.

SUMMARY

According to one aspect of the present disclosure, a communications circuit including a host interface is provided. The circuit includes a processor implemented, unitary media access controller interfacing with each of a first transmit and receive circuit and a second transmit and receive circuit. The circuit also includes the first transmit and receive circuit configured to transmit and receive data over a first operating frequency range. The circuit also includes the second transmit and receive circuit configured to transmit and receive data over a second, different operating frequency range. The controller includes a multi-band manager configured to direct a first portion of a plurality of data frames received from the host interface to the first transmit and receive circuit and a second portion of the plurality of data frames to the second transmit and receive circuit. Other embodiments of this aspect include corresponding computer systems, apparatus, and computer programs recorded on one or more computer storage devices, each configured to perform the actions of the methods.

Implementations may include a circuit where the controller includes a scheduler configured to determine frames for the first portion and frames for the second portion. The plurality of frames may be received from the host interface in a sequence and the multi-band manager is further configured to reorder frames out-of-sequence to the first portion and the second portion. A received plurality of data frames may be received from the first transmit and receive circuit and the second transmit and receive circuit, the received plurality of data frames having a sequence, and the multi-band manager may further be configured to reorder any received plurality of data frames which are out of sequence back into sequence. The controller may be configured to alter a frame structure of the plurality of data frames to include a multi-band trigger. The first operating frequency range may be centered on 5 Ghz and the second operating frequency range may be centered on 6 Ghz, each having a frequency bandwidth range of at least 80 Mhz. The circuit may be configured such that each frame in the plurality of frames includes a MAC protocol data unit (MPDU) and has a size of 45816 bytes. The circuit may further be configured such that a plurality of MPDUs are aggregated and a maximum number of aggregated MPDUs is 1024. Implementations of the described techniques may include hardware, a method or process, or computer software on a computer-accessible medium.

One general aspect includes a method. The method includes accessing a plurality of frames of a data stream. The method includes scheduling a first portion of the plurality of frames for transmission via a first transmit and receive circuit coupled to a first data channel having a first operating frequency rang. The method also includes scheduling a second portion of the plurality of frames for transmission via a transmit and receive circuit coupled to a second data channel having a second, different operating frequency range. The method includes transmitting the plurality of frames via the first data channel and the second data channel, at least some of the first portion of the frames and the second portion of the plurality of frames being transmitted via the first data channel and the second data channel, respectively, at the same time.

Implementations of the method may include one or more of the following features. The method may include receiving the plurality of frames from an application, prioritizing a subset of frames in the plurality of frames as more important than other of the plurality of frames, and where scheduling the plurality of frames via the first data channel and the second data channel is based on priority. The plurality of frames may be received in a sequence, and where the method further may include re-ordering the frames out of sequence, prior to transmitting. Re-ordering the frames out of sequence the plurality of frames may include reordering physical layer convergence procedure (PLCP) protocol data units (PPDUs). The first operating frequency range may be centered on 5 GHz and the second operating frequency range may be centered on 6 GHz, each having a frequency bandwidth range of at least 80 mhz. The method may include adding a multi-channel trigger to a first frame of the first portion of the plurality of frames. Accessing a plurality of frames in a data stream may include receiving MAC protocol data units (MPDU) having a size of 45816 bytes.

Another aspect may include a user device. The user device includes a first transmit and receive circuit configured to transmit and receive data in a first operating frequency range. The user device also includes a second transmit and receive circuit configured to transmit and receive data in a second, different operating frequency range; and a processor including code adapted to instruct the processor to implement a unitary media access control (MAC) controller between a host interface of the user device and each of the first and second transmit and receive circuits the code instructing the processor to. The user device also includes receive a plurality of data frames from the host interface. The user device also includes schedule a first portion of the plurality of frames for transmission via the first transmit and receive circuit. The user device also includes schedule a second portion of the plurality of frames for transmission via the second transmit and receive circuit. The user device also includes transmit the plurality of frames via the first transmit and receive circuit and the second transmit and receive circuit, at least some of the first portion of the frames and the second portion of the plurality of frames being transmitted via the first transmit and receive circuit and the second transmit and receive circuit, respectively, at the same time.

Implementations may include a user device wherein the MAC controller includes a scheduler configured to determine frames for the first portion and frames for the second portion. The plurality of frames may be received from the host interface in a sequence and the MAC controller is further configured to reorder frames out-of-sequence to the first portion and the second portion. The user device may further include code adapted to cause the MAC controller to receive a second plurality of data frames is received from the first transmit and receive circuit and the second transmit and receive circuit, the received plurality of data frames having a sequence, and the MAC controller is further configured to reorder any received plurality of data frames which are out of sequence back into sequence. The device code may instruct the processor to include a multi-channel trigger in a first data frame of the first data channel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures (FIGS.) for which like references indicate elements.

FIG. 15A shows data burst sizes and spacings in 802.11ax devices as compared with burst sizes and spacings in an extremely high throughput burst.

FIG. 15B shows longer MAC protocol data unit burst times relative to those in FIG. 15A.

DETAILED DESCRIPTION OF ILLUSTRATIVE EMBODIMENTS

The present disclosure will now be described with reference to the figures, which in general relate to systems and methods of transmitting and receiving data that may be used in various communication systems, e.g. in wireless communication networks such as Wi-Fi networks, cellular telephone networks, or other wireless communication networks.

The present disclosure includes a multi-band, single (or unitary) MAC for multi-frequency-band operation for extremely high throughput (EHT) wireless communication. The technology is adapted to transmit and receive data on multiple wireless operating frequency ranges, including for example the 5 GHz and 6 GHz bands, which may be expanded to any number of bands and/or channels. The technology features a single, unitary MAC controller architecture which interfaces with multiple physical layer devices, with at least one physical layer device per band. The MAC controller may interface with user applications through a host interface, and each user application may take advantage of transmitting and receiving data on multiple frequency bands. In one alternative, a larger MAC protocol data unit (MPDU) may be utilized to increase throughput efficiency. In addition, a flexible packet reordering scheme may be utilized. A minimum of 80 MHz bandwidth allows efficient splitting of one physical layer convergence procedure (PLCP) protocol data unit (PPDU) (sometimes referred to as the physical protocol data unit) into multiple PPDUs.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
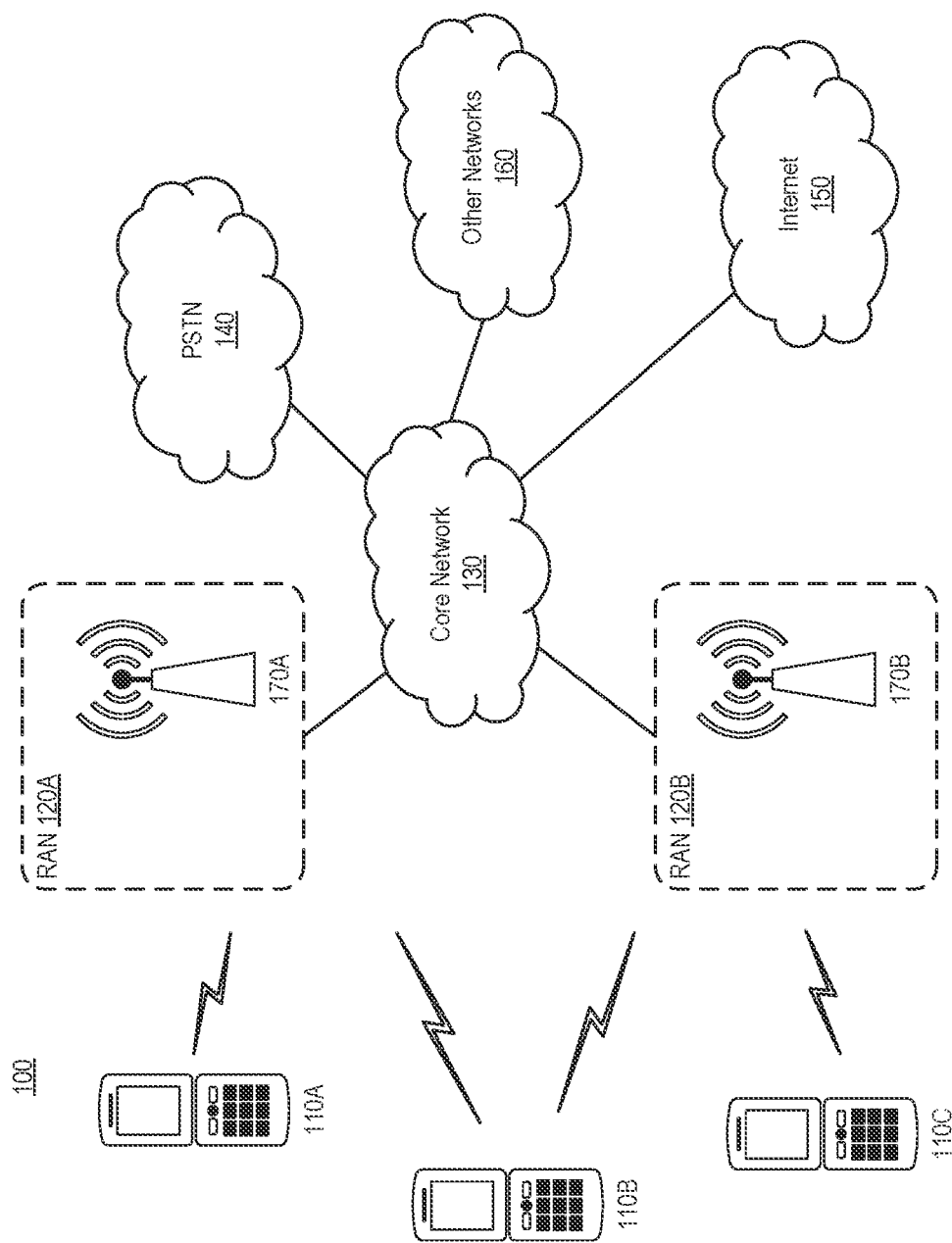
FIG. 1 illustrates an exemplary wireless network for communicating data.

FIG. 1 illustrates a wireless network for communicating data. The communication system too includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system too.

In one embodiment, the RANs 120A-120B may include access points (APs) 170 configured to form one or more Wireless Local Area Networks (WLANs). For example, APs 170A-170B (APs 170) may use technology such as defined by IEEE 802.11n or 802.11ax to provide wireless network access to one or more devices (e.g. User Equipment 110A)

in a home, workplace, airport, or other location. APs 170 may employ orthogonal frequency-division multiplexing (OFDM) to communicate with User Equipment 110A-110C.

In one embodiment, the RANs 120A-120B may include millimeter and/or microwave (mmW) access points such as APs 170. The APs may include, but are not limited to, a connection point (an mmW CP) capable of mmW communication (e.g., a mmW base station). The mmW APs may transmit and receive signals in a frequency range, for example, from 24 GHz to 100 GHz, but are not required to operate throughout this range.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB. The term "access point" or "AP" is generally used in this application to refer to an apparatus that provides wireless communication to user equipment through a suitable wireless network, which may include a cellular network, and it will be understood that an AP may be implemented by a base station of a cellular network.

System too enables multiple wireless users to transmit and receive data and other content. The system too may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system too. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, tablet, wireless sensor, wearable devices or consumer electronics device.

In the depicted embodiment, the RANs 120A-120B include one or more base stations or access points 170A, 170B (collectively, base stations or access points 170). Each of the access points 170 is configured to wirelessly interface with one or more of the UEs 110A, 110B, 110C to enable access to the core network 130, the PSTN 140, the Internet 150, and/or the other networks 160. For example, the Access Points (APs) 170 may include one or more of several well-known devices, such as a wireless router, or a server, router, switch, or other processing entity with a wired or wireless network, a base transceiver station (BTS), a Node-B (NodeB), an evolved NodeB (eNB), a next (fifth) generation (5G) NodeB (gNB), a Home NodeB, a Home eNodeB, or a site controller.

In one embodiment, the AP 170A forms part of the RAN 120A, which may include other APs, elements, and/or devices. Similarly, the AP 170B forms part of the RAN 120B, which may include other APs, elements, and/or devices. Each of the APs 170 operates to transmit and/or receive wireless signals within a particular geographic region or area (sometimes referred to as a "cell" in a cellular network). In some embodiments, multiple-input multiple-output (MIMO) technology may be employed having multiple transceivers for each area.

The APs 170 communicate with one or more of the user equipment 110A-110C over one or more air interfaces (not shown) using wireless communication links. The air interfaces may utilize any suitable radio access technology.

It is contemplated that the system too may use multiple channel access functionality, including for example schemes in which the APs 170 and user equipment 110A-110C are configured to implement an IEEE 802.11 standard (e.g. the IEEE 802.11ax standard), the Long Term Evolution wireless communication standard (LTE), LTE Advanced (LTE-A), and/or LTE Multimedia Broadcast Multicast Service (MBMS). In other embodiments, the APs 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

Although FIG. 1 illustrates one example of a communication system, various changes may be made to FIG. 1. For example, the communication system too could include any number of user equipment, access points, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
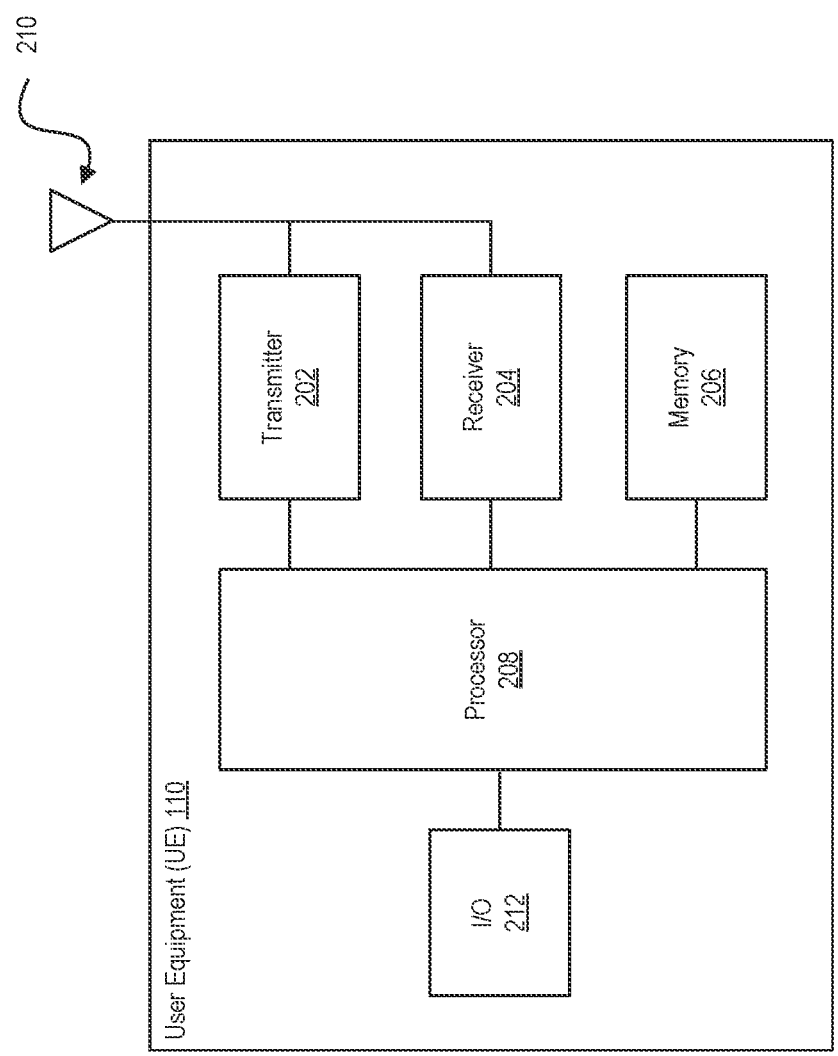
FIG. 2 illustrates exemplary details of an instance of user equipment (UE) introduced in FIG. 1.

FIG. 2 illustrates an example details of a UE 110 that may implement the methods and teachings according to this disclosure. The UE 110 may for example be a mobile telephone but may be other devices in further examples such as a desktop computer, laptop computer, tablet, hand-held computing device, automobile computing device and/or other computing devices. As shown in the figure, the exemplary UE 110 is shown as including at least one transmitter 202, at least one receiver 204, memory 206, at least one processor 208, and at least one input/output device 212. The processor 208 can implement various processing operations of the UE 110. For example, the processor 208 can perform signal coding, data processing, power control, input/output processing, or any other functionality enabling the UE 110 to operate in the system too (FIG. 1). The processor 208 may include any suitable processing or computing device configured to perform one or more operations. For example, the processor 208 may include a microprocessor, microcontroller, digital signal processor, field programmable gate array, or application specific integrated circuit.

The transmitter 202 can be configured to modulate data or other content for transmission by at least one antenna 210. The transmitter 202 can also be configured to amplify, filter and to frequency convert RF signals before such signals are provided to the antenna 210 for transmission. The transmitter 202 can include any suitable structure for generating signals for wireless transmission.

The receiver 204 can be configured to demodulate data or other content received by the at least one antenna 210. The receiver 204 can also be configured to amplify, filter and frequency convert RF signals received via the antenna 210. The receiver 204 can include any suitable structure for processing signals received wirelessly. The antenna 210 can include any suitable structure for transmitting and/or receiving wireless signals. The same antenna, antenna 210, can be used for both transmitting and receiving RF signals, or alternatively, different antennas can be used for transmitting signals and receiving signals.

It is appreciated that one or multiple transmitters 202 could be used in the UE 110, one or multiple receivers 204 could be used in the UE 110, and one or multiple antennas 210 could be used in the UE 110. Although shown as separate blocks or components, at least one transmitter 202 and at least one receiver 204 could be combined into a transceiver. Accordingly, rather than showing a separate block for the transmitter 202 and a separate block for the receiver 204 in FIG. 2, a single block for a transceiver could have been shown.

The UE 110 further includes one or more input/output devices 212. The input/output devices 212 facilitate interaction with a user. Each input/output device 212 includes any suitable structure for providing information to or receiving information from a user, such as a speaker, microphone, keypad, keyboard, display, or touch screen.

In addition, the UE 110 includes at least one memory 206. The memory 206 stores instructions and data used, generated, or collected by the UE 110. For example, the memory 206 could store software or firmware instructions executed by the processor(s) 208 and data used to reduce or eliminate interference in incoming signals. Each memory 206 includes any suitable volatile and/or non-volatile storage and retrieval device(s) and/or circuitry. Any suitable type of memory may be used, such as random-access memory (RAM), read only memory (ROM), hard disk, optical disc, subscriber identity module (SIM) card, memory stick, secure digital (SD) memory card, and the like. It should be understood that UE 110 includes logic, whether in the form of software or circuitry that causes the UE 110 to operate according to the principles disclosed and claimed herein.

Figure 3:
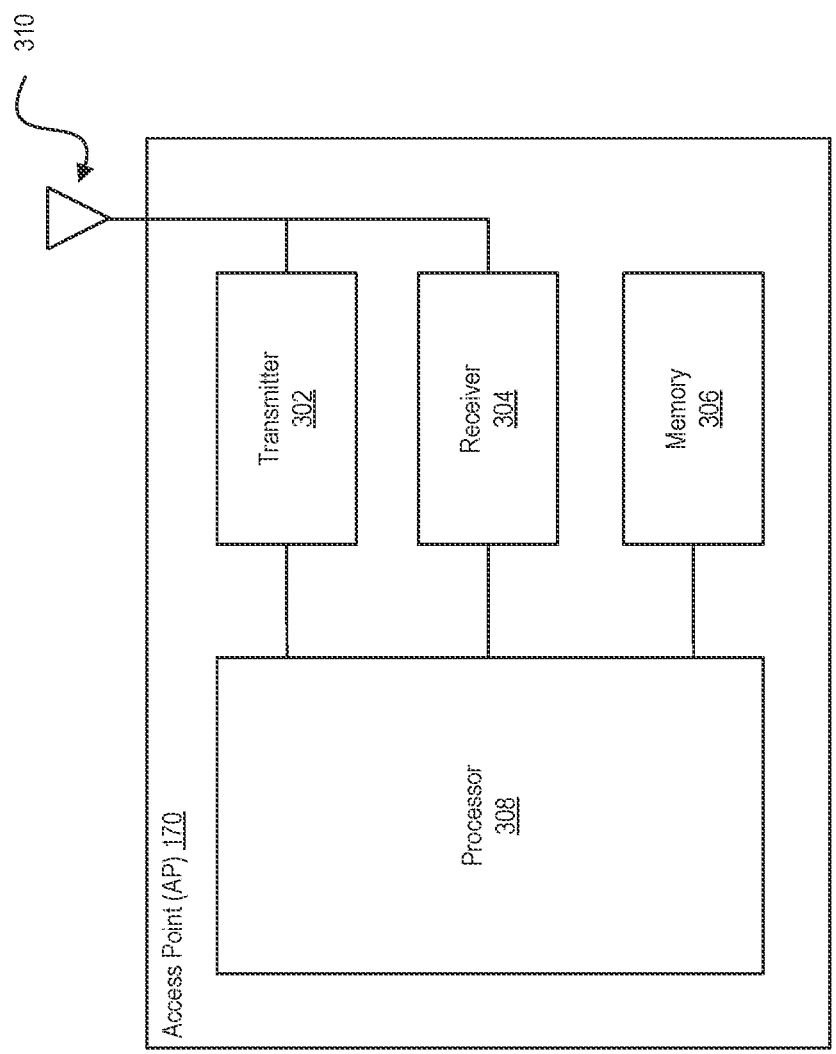
FIG. 3 illustrates exemplary details of an instance of an Access Point (AP) introduced in FIG. 1.

FIG. 3 illustrates an example AP 170 that may implement the methods and teachings according to this disclosure. As shown in the figure, the AP 170 includes at least one processor 308, at least one transmitter 302, at least one receiver 304, one or more antennas 310, and at least one memory 306. The processor 308 implements various processing operations of the AP 170, such as signal coding, data processing, power control, input/output processing, or any other functionality. Each processor 308 includes any suitable processing or computing device configured to perform one or more operations. Each processor 308 could, for example, include a microprocessor, microcontroller, digital signal processor, field programmable gate array, or application specific integrated circuit.

Each transmitter 302 includes any suitable structure for generating signals for wireless transmission to one or more UEs 110 or other devices. Each receiver 304 includes any suitable structure for processing signals received wirelessly from one or more UEs 110 or other devices. Although shown as separate blocks or components, at least one transmitter 302 and at least one receiver 304 may be combined into a transceiver. Each antenna 310 includes any suitable structure for transmitting and/or receiving wireless signals. While a common antenna 310 is shown here as being coupled to both the transmitter 302 and the receiver 304, one or more antennas 310 could be coupled to the transmitter(s) 302, and one or more separate antennas 310 could be coupled to the receiver(s) 304. Each memory 306 includes any suitable volatile and/or non-volatile storage and retrieval device(s).

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. Byway of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

The need for higher bandwidth and higher throughput is generally growing in the wireless communication industry. The available spectrum resources are limited and very expensive. Instead of allocating more spectrum and spending more on additional bands of spectrum, one current trend is to aggregate available spectrum bands together to form a multi-band operation to increase operation bandwidth so that aggregated throughput could be high enough to meet the demands within available spectrum bands (i.e. without having to pay for additional frequencies). One popular method of multi-band operations is to utilize transmitters in each frequency band and transmit data frames through multiple frequency bands at the same time. For this popular multi-band operation to work, data frame sequences generally have to be kept. Some technology for reordering does not apply well to the multi-band operations as will be described here. Aspects of the present technology facilitate reordering in multi-band operations. It should be understood that AP 170 includes logic, whether in the form of software or circuitry that causes the AP 170 to operate according to the principles disclosed and claimed herein.

Figure 4:
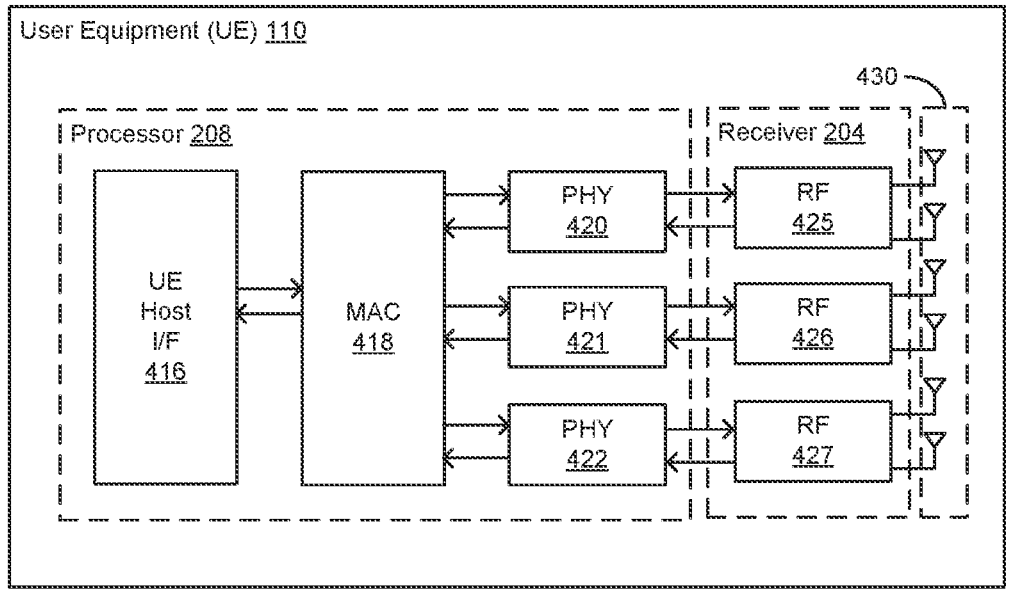
FIG. 4 illustrates exemplary details of an implementation of UE of FIG. 2.

FIG. 4 shows an example of an implementation of UE 110 that is adapted for multi-band operations. FIG. 4 shows receiver 204 including individual RF band transmitter/receivers 425, 426, 427, each of which may transmit and receive an RF signal over a different RF band to allow multi-band operation of UE 110. Processor 208 is adapted for multi-band operation and includes individual physical layer (PHY) transmit and receive circuits 420, 421, 422 coupled respectively to individual RF band receivers 425, 426, 427. PHY layer circuits 420, 421, 422 are connected to Media Access Control (MAC) layer circuit (or MAC controller) 418, which is connected to UE host interface 416 to provide communication with additional components of UE 110 or external to UE 110. While receiver 204 is illustrated in FIG. 4, it will be understood that a transmitter such as transmitter 202 may be similarly configured for multi-band operation, or that receiver 204 may be configured as a transceiver (e.g. RF band receivers 425, 426, 427 may be configured for transmission also). RF band receivers 425, 426, 427 are coupled to respective antennas 430 to facilitate receiving (and, in some cases, transmitting) RF signals. While shown as separate circuits, it will be understood that processor 208 and receiver 204 may be implemented in a common integrated circuit (IC), e.g. as a system on a chip (SOC) or other structure.

Figure 5:
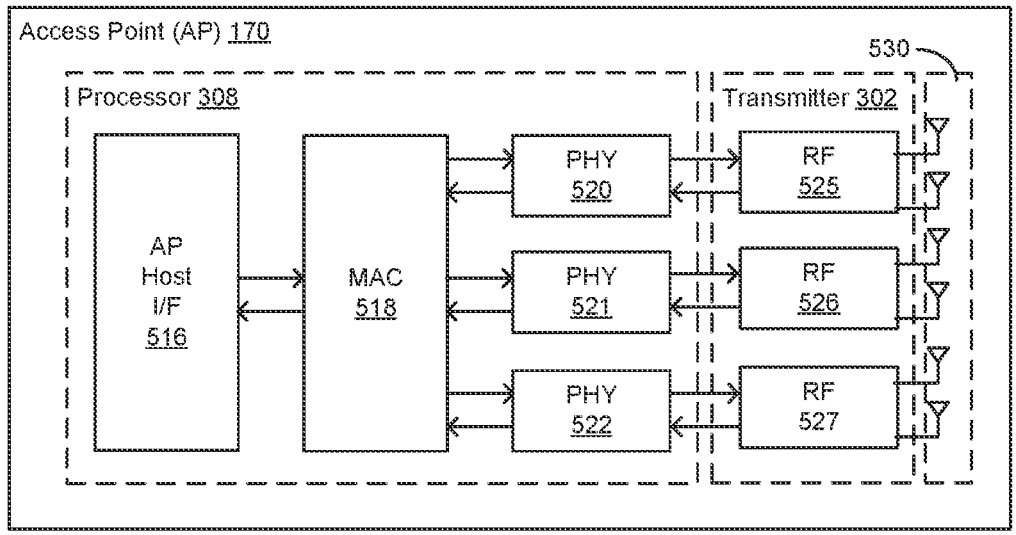
FIG. 5 illustrates exemplary details of an implementation of AP of FIG. 1.

FIG. 5 illustrates an example of an implementation of AP 170 that is adapted for multi-band operations (e.g. in communication with one or more UEs such as UE 110 as illustrated in FIG. 4). AP 170 includes transmitter 302, which in this implementation includes individual RF band transmitters 525, 526, 527, each of which transmits over a different RF band to allow multi-band operation of AP 170. Processor 308 is adapted for multi-band operation and includes individual physical layer (PHY) layer physical transmit and receive circuits 520, 521, 522 coupled respectively to individual RF band transmitters 525, 526, 527. PHY layer circuits 520, 521, 522 are connected to MAC layer circuit (or MAC controller) 518, which is connected to AP host interface 516 to provide communication with additional components of AP 170 or external to AP 170. While transmitter 302 is illustrated in FIG. 5, it will be understood that a receiver such as receiver 304 may be similarly configured for multi-band operation, or that transmitter 302 may be configured as a transceiver (e.g. RF band transmitters 525, 526, 527 may be configured for receiving also). RF band transmitters 525, 526, 527 are coupled to respective antennas 530 to facilitate transmitting (and, in some cases, receiving) RF signals. While shown as separate circuits, it will be understood that processor 308 and transmitter 302 may be implemented in a common integrated circuit (IC), e.g. as a system on a chip (SOC) or other structure.

Figure 6:
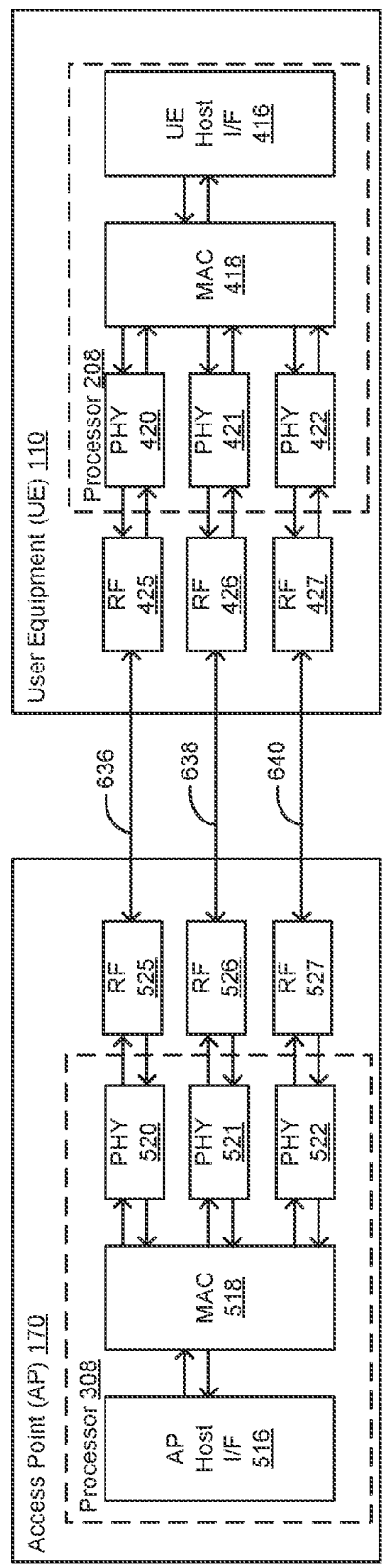
FIG. 6 illustrates an example of multi-band communication.

FIG. 6 illustrates an example of operation of AP 170 in communication with UE 110 to provide multi-band communication (e.g. in a WLAN using Wi-Fi technology, in a cellular network, or other communication network). This communication may be two-way communication with RF components (e.g. RF band transmitters 525, 526, 527 and RF band receivers 425, 426, 427) configured to both transmit and receive (configured as transceivers) and/or with the addition of other components to facilitate bi-directional communication. Individual RF band transmitter 525 is in communication with individual RF receiver 425 via communication channel 636 (e.g. using a first RF band). Individual RF band transmitter 526 is in communication with individual RF receiver 426 via communication channel 638 (e.g. using a second RF band). Individual RF band transmitter 527 is in communication with individual RF receiver 427 via communication channel 640 (e.g. using a third RF band). The three communication channels, using three RF bands, may be configured to convey data of a single data stream in parallel (e.g. to stream data from AP 110 to UE 110) to thereby provide high speed communication. Additional communication channels between AP 170 and UE 110 may be provided and the number of such channels and corresponding RF components is not limited to any particular number.

Figure 7:
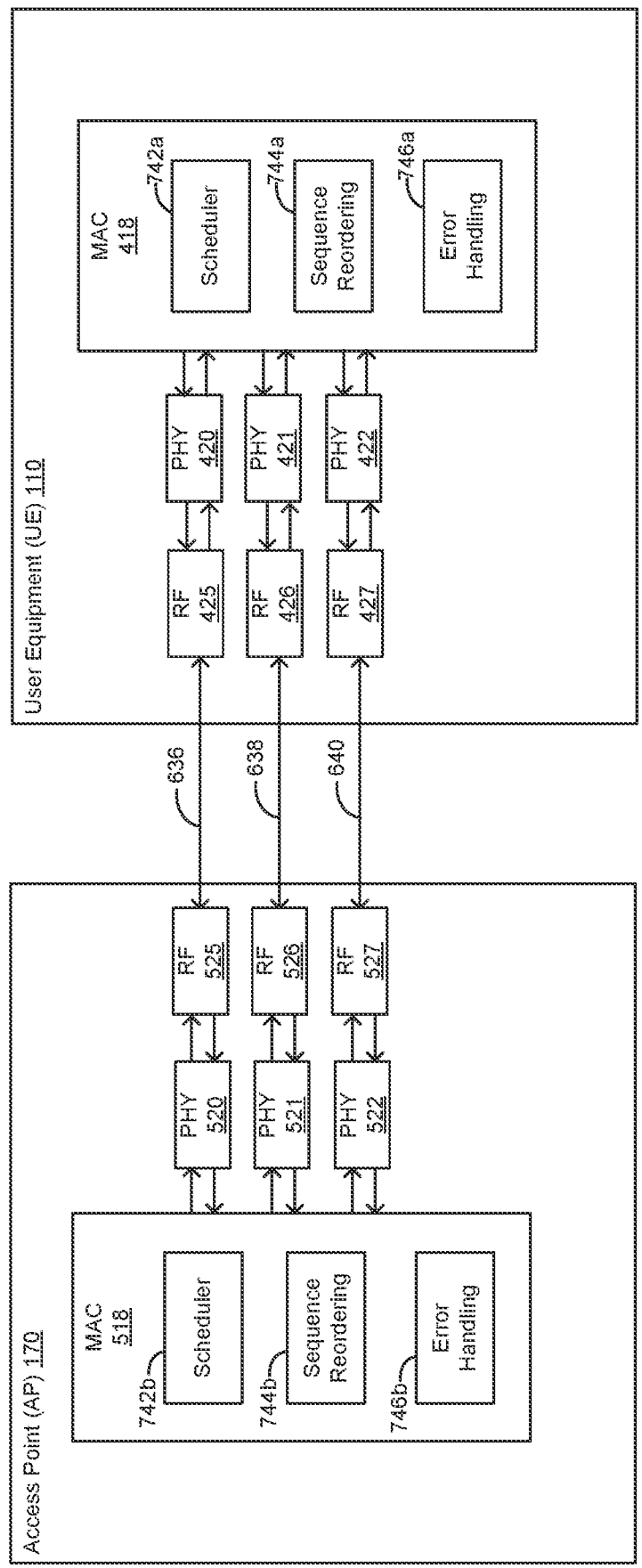
FIG. 7 illustrates examples of a UE and AP configured for multi-band communication.

FIG. 7 illustrates certain components of the MAC controllers 418 and 518 in UE 110 and AP 170, respectively, that are common in both devices and which facilitate multi-band operation of communication channels 636, 638, and 640. For example, FIG. 7 shows a UE 110 and AP 170 with a multi-band single MAC 418 and MAC 518 each respectively including: scheduler 742a, 742b; PPDU sequence reordering circuit 744a, 744b; and error handler 746a, 746b. In operation, scheduler 742, PPDU sequence reordering circuit 744, and error handler 746 are used when data of a data stream is sent or received via communication channels 636, 638, and 640.

Scheduler 742 assigns bandwidth resources and is responsible for deciding on how uplink and downlink channels are used by AP and UE of a cell. It also enforces the necessary Quality of Service for connections. Sequence reordering circuit 744 may operate to reorder PPDUs on transmission or reception over one or more communication channels. Error handler 746 checks received data for encoding or encapsulation errors.

Figure 8:
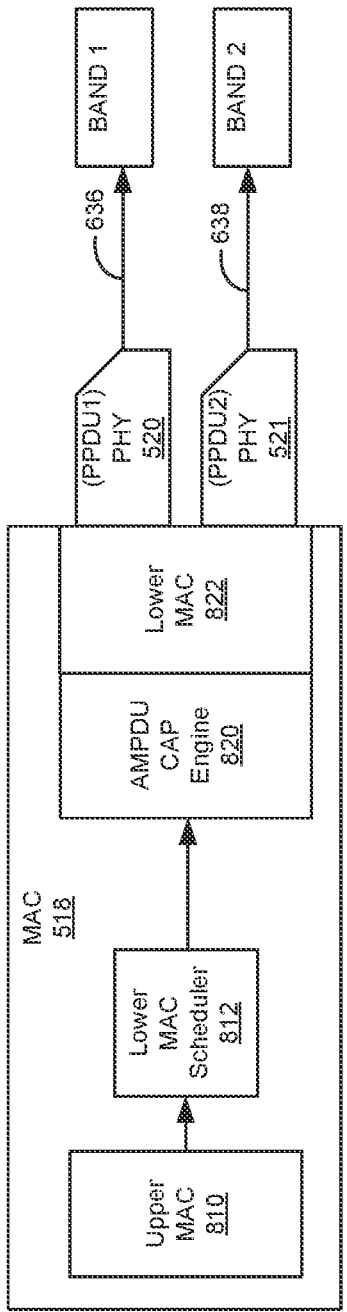
FIG. 8 illustrates of a multi-band single MAC communication device operating in transmission mode.
Figure 9:
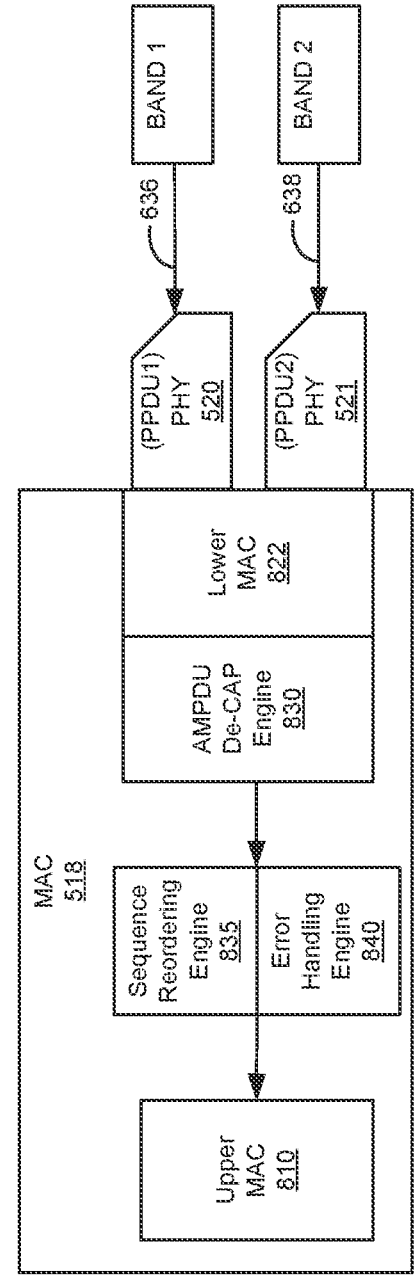
FIG. 9 illustrates of a multi-band single MAC communication device operating in reception mode

FIGS. 8-9 illustrate the components of MAC controller 518 in FIG. 7 when utilized in transmission and reception multi-band operation. FIG. 8 shows an example of operation of a multi-band single MAC controller 518 operating in transmission mode in an AP 170. It should be recognized that operation of MAC controller 418 in a UE 110 would be similar. Transmission communication channels 636, 638 transmit data on two different transmission frequency bands BAND1, BAND2. Such transmission may be asynchronous. In one embodiment, communication channel 636 operates in the 5 GHZ band, for example, and channel 638 operates in the 6 GHZ band. Data from a host interface (such as AP host I/F 516 or UE Host I/F 416) is received by MAC 518. In FIG. 8, data is received by an upper MAC 810 which is a portion of the MAC 518 which can enqueue a packet into any of a number of outgoing wireless transmission queues. The upper-level MAC processes any currently filled transmit queues to a lower-MAC scheduler 812, which determines which channel 636, 638 the packet will be transmitted on.

In wireless technology, multiple frames (MPDUs) can be aggregated and transmitted in one burst, or Aggregated MPDU (AMPDU). This aggregation is to increase the maximum burst length of Wi-Fi transmissions. The A-MPDU encapsulation engine aggregates multiple MAC protocol data units (MPDUs) together for transmission to the physical layer circuits 520, 521. The physical layer circuits 520, 521 append a preamble and PHY header information to create a PPDU. As illustrated, one or more PPDUs (PPDU1) are transmitted on a first band (BAND 1) on channel 636 via physical layer circuit 520, while one or more other PPDUs (PPDU1) are transmitted on a second band (BAND2) on channel 638 via physical layer circuit 521.

FIG. 9 shows an example of operation of a multi-band single MAC operating in reception mode in a UE 110 or an AP 170. Transmission communication channels 636, 638 receive data on two different transmission bands BAND1, BAND2. One or more PPDUs (PPDU1) is received on channel 636 at physical layer circuit 520 and one or more different PPDUs (PPDU2) is received on physical layer circuit 521. Data from each channel is provided by lower MAC 822 to an AMPDU de-encapsulation (DECAP) engine 830, which provides the individual data packets to a sequence reordering engine 835 and error handline engine 840. As illustrated below in FIGS. 12A and 12B, packets may be transmitted out of sequence and re-ordered in one embodiment of the multi-band MAC 518. Data is then provided to the upper MAC 810 for provision to the host interface (such as AP host I/F 516 or UE Host I/F 416).

Figure 10:
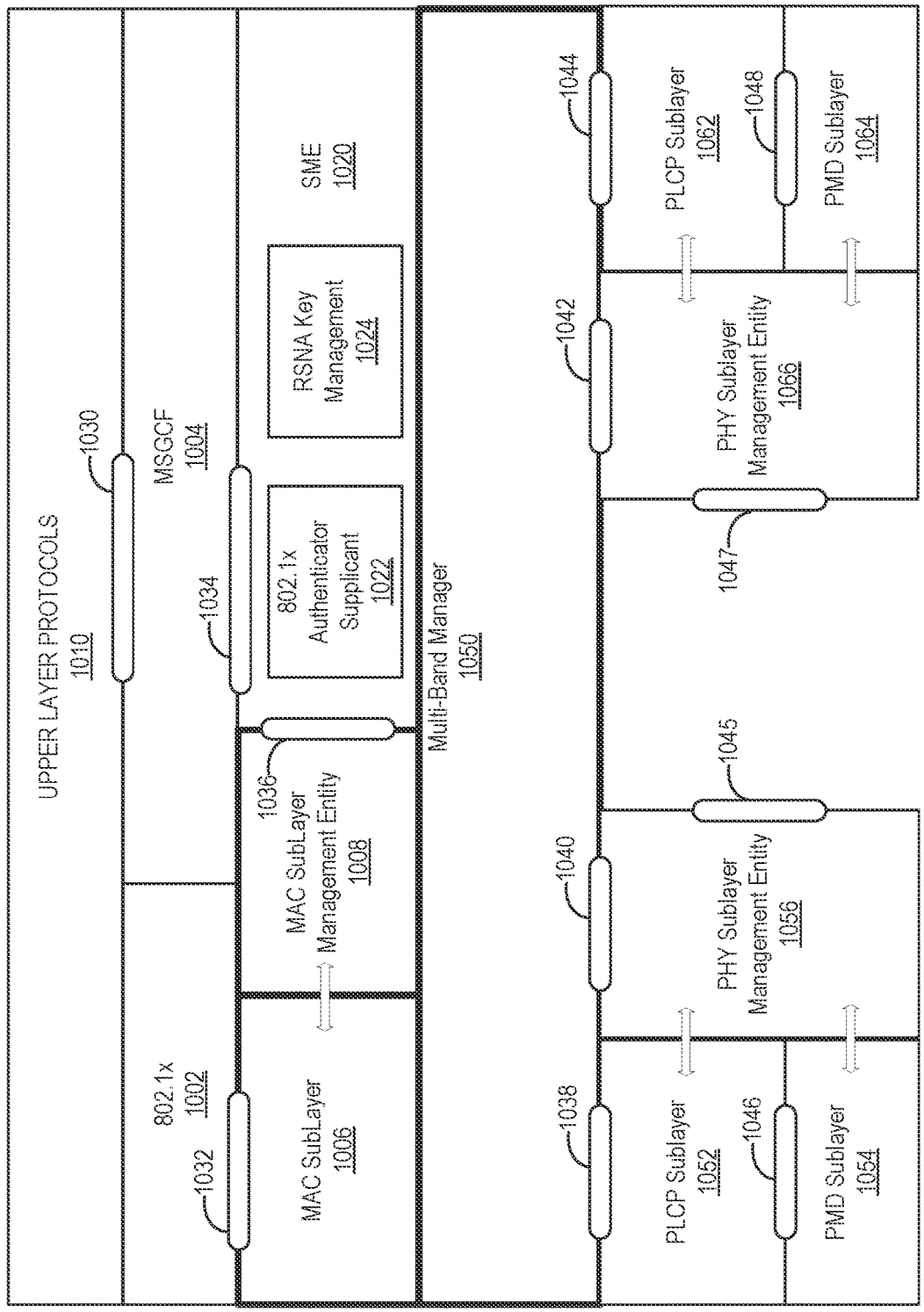
FIG. 10 illustrates an exemplary architecture for a multi-band MAC 518.

FIG. 10 illustrates an exemplary architecture for a multi-band MAC 518. Upper layer protocols 1010 interface directly with one or more user applications providing and receiving data via the wireless network. The upper layer protocols 1010 communicate with the MAC state convergence function 1004 through a service access point (SAP) 1030. The MAC state convergence function (MSGCF) 1004 correlates information from the MAC management entities for consumption by upper layer protocols 1010 that require information based on the state of an 802.1x interface 1002. The 802.1x interface 1002 communicates with the MAC sublayer 1006 via a MAC SAP 1032. A service management entity 1020 includes an 802.1x authenticator supplicant and an RSNA key management module 1024 used for 802.1x authentication. The SME 1020 is a layer-independent entity responsible for such functions as the gathering of layer dependent status from the various layer management entities, and similarly setting the value of layer-specific parameters. The SME 1020 communicates with the MAC Sublayer management entity 1008 via a SAP 1036. A multi-band manager1050, MAC sublayer 1006 and MAC sublayer management entity 1036 communicate with the Physical Layer Convergence Protocol (PLCP) sublayers 1052, 1062 and PHY sublayer management entities 1056, 1066 SAPs 1038, 1040, 1042 and 1044. As illustrated, two PLCP sublayers 1052, 1062, PHY Sublayer Management entities 1056, 1066 and Physical Medium Dependent (PMD) sublayer 1054, 1064 are provided, one for each channel.

In general, the multi-band manager 1050, MAC sublayer 1006 and MAC sublayer management entity 1008 may be considered as implemented in the "lower" MAC (illustrated by the bold outlining of such entities in FIG. 10). The PLCP sublayer prepares MAC protocol data units (MPDUs) for transmission. The PLCP minimizes the dependence of the MAC layer on the PMD sublayer by mapping MPDUs into a frame format suitable for transmission. The PLCP also delivers incoming frames from the wireless medium to the MAC layer. The PLCP appends a PHY-specific preamble and header fields to the MPDU that contain information needed by the physical layer transmitters and receivers. The 802.11 standard refers to this composite frame (the MPDU with an additional PLCP preamble and header) as a PLCP protocol data unit (or PPDU). The MPDU is also called the PLCP Service Data Unit (PSDU) and is typically referred to as such when referencing physical layer operations. The frame structure of a PPDU provides for asynchronous transfer of PSDUs between stations.

Under the direction of the PLCP, the Physical Medium Dependent (PMD) sublayers 1054, 1056 provide transmission and reception of Physical layer data units between two stations via the wireless medium. The PMD interfaces directly with the wireless medium (that is, RF in the air) and provides modulation and demodulation of the frame transmissions. The PLCP and PMD sublayers communicate via SAPs 1046, 1048 to govern the transmission and reception functions. The MAC sublayer management entity 1008 and the PHY sublayer management entities 1056, 1066. provide the layer management service interfaces through which layer management functions may be invoked.

Figure 11:
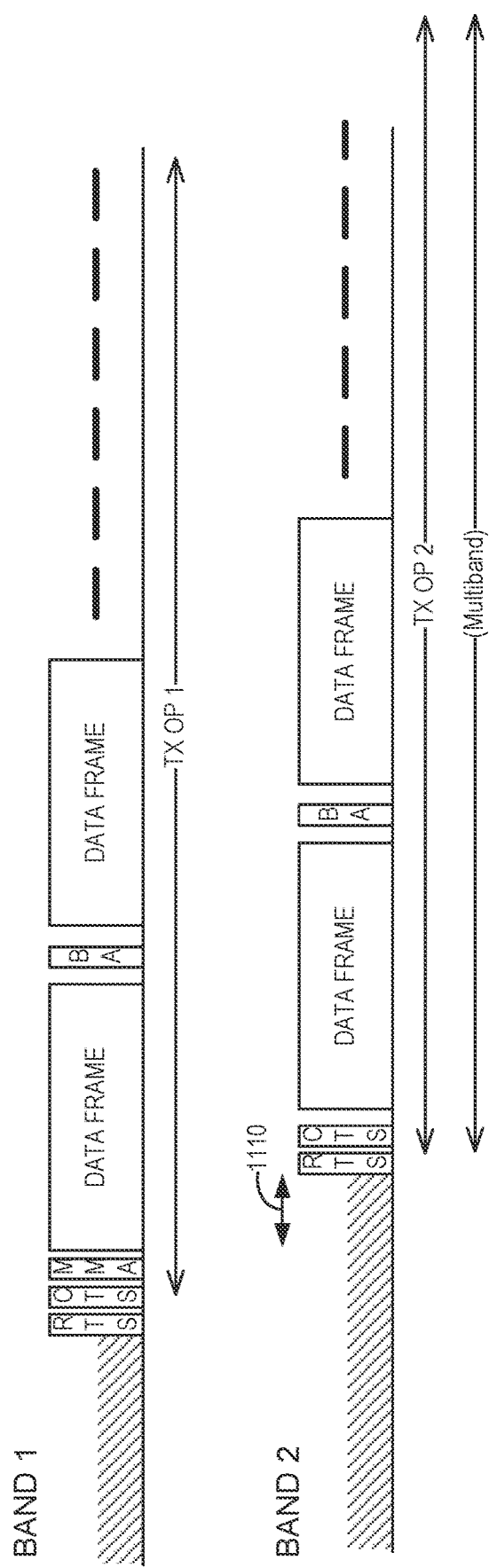
FIG. 11 illustrates a simplified view of an RTS/CTS WLAN frame structure.
Figure 12A:
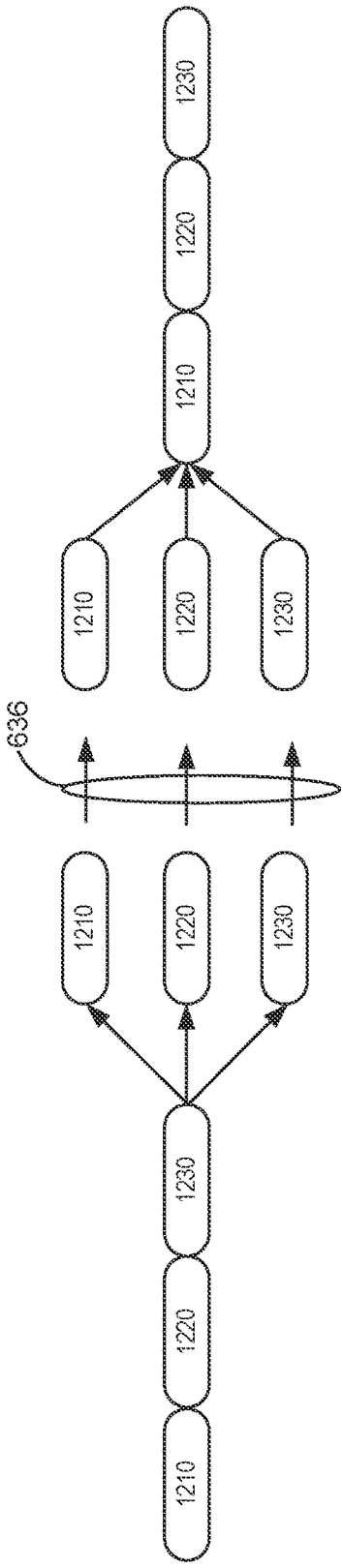
FIGS. 12A-B illustrate the flexible reordering scheme which may be utilized with the multi-band communications system.
Figure 12B:
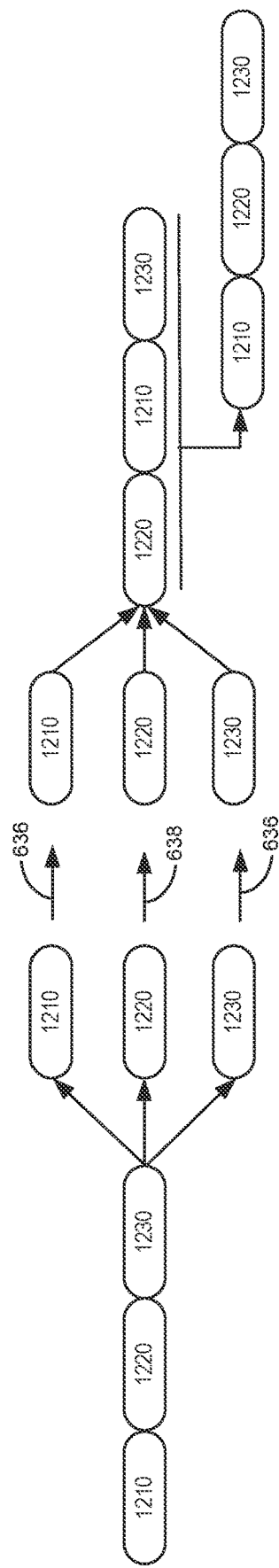

The multi-band manager 1050 performs many of the functions described herein, including determining whether to operate in multiband operation, adding the multiband flag (FIG. 11) and PPDU reordering (FIGS. 12A and 12B).

In order to operate in a multi-band environment, both devices must be multi-band enabled. However, each device should also be capable of single band operation.

FIG. 11 illustrates a simplified view of an RTS/CTS WLAN frame structure which alerts other devices to multi-band capability using a multi-band trigger. In general, in 802.11 wireless LAN protocols, a MAC frame is constructed of common fields (which present in all types of frames) and specific fields (present in certain cases, depending on the type and subtype specified in the first octet of the frame). Two such control fields are the RTS/CTS (Request to Send/Clear to Send) fields used by the 802.11 wireless networking protocol to reduce frame collisions. Also illustrated in FIG. 11 is the Block Acknowledge (BA) field and user Data fields.

In the present technology, one or more reserved control bits MMA may be used as a multi-mode announcement control, announcing to other devices that the sending device is capable of multi-band communication. The announcement occurs on BAND1, which may be referred to as a primary band. BAND2, in this instance, can begin transmitting DATA after a minimum setup time (arrow) 1110. Transmit operation 1 (TX OP 1) begins as soon as the clear to send bit is received by the transmitting device. Transmit operation two (TX OP 2) begins after the minimum setup time and the overlay between the transmit operations comprises the period of multi-band operation.

In operation, UEs may join an AP on its primary channel (BAND1), and the AP will start multi-band operation after acquiring channel access. The AP may operate in dynamic mode, sending the multi-band announcement frame (MMA in FIG. 11) to start multi-band operation. In the MMA frame, band information and duration information may be included. After a minimum delay (illustrated by arrow 1110 in FIG. 11), the AP starts transmitting in multi-band operation.

Data from one traffic stream (from an application via the upper protocol layers) can be packed into different PPDUs to be sent to different bands. This increases the total throughput of a single data stream.

FIGS. 12A and 12B illustrate the flexible reordering scheme which may be utilized with the multi-band communications system. Illustrated in FIG. 12A is a standard method of transmission and reception of a PPDU stream. As illustrated therein, PPDUs 1210, 1220 and 1230 are transmitted in an ordered sequence (1210,1220,1230) and may be sent over a single channel 636 (or multiple channels) but maintained in sequential order so that they are received in the same order transmitted.

In the present multi-band technology, it is possible to re-prioritize packets on the basis of any of a number of factors, such as, for example, quality priority, data importance, or customer preferences. As illustrated in FIG. 12B, packet 1210 and 1230 may be sent via channel 636 while packet 1220 is sent via channel 638. As such, packet 1220 may arrive at its destination in advance of packets 1210 and 1230. The sequence reordering engine may re-organize the packets into the correct order as illustrated in FIG. 12B.

Figure 13:
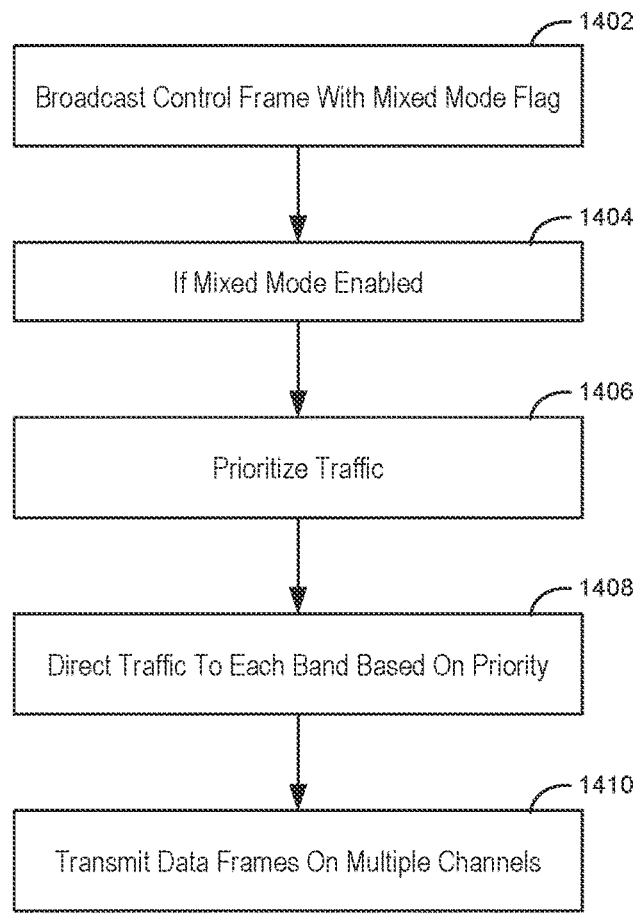
FIG. 13 is a flow chart illustrating a method performed by the multi-band single MAC to transmit data.

FIG. 13 is a flow chart illustrating a method performed by the multi-band single MAC to transmit data based on priority on multiple transmission bands. At 1402, the transmitting device (UE or AP) will broadcast a control frame (FIG. 11) indicating that it is a multi-band capable device. If the receiving device is multi-band capable at 1404, the multi-band single MAC on the transmitting device can prioritize data based on one or more factors at 1406. (If the receiving device is not multi-band capable at 1404, the device transmits data on only one band, allowing the device to be backward compatible with existing devices.) At 1408, traffic can be re-ordered and directed to different bands based on the priority established at 1406. At 1410, data is then transmitted on multiple bands in accordance with the foregoing discussion.

Figure 14:
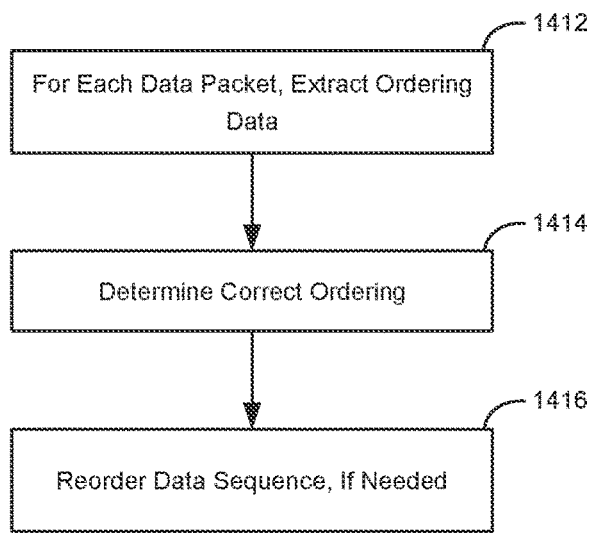
FIG. 14 is a flow chart illustrating a method performed by the multi-band single MAC to receive data.

FIG. 14 is a flowchart illustrating reordering of the data upon receipt of the data. At 1412, upon receipt of each data packet, the ordering data is extracted. At 1414, the correct ordering is determined and at 1416, the data is output to the higher-level protocols in the correct order.

In one embodiment of the technology, the burst size is increased by the maximum number of frames that can be aggregated into one transmission and the maximum size of each data frame. FIGS. 15A and 15B illustrate this aspect of the technology. In Wi-Fi and other communication systems, data bursts are transmitted with a separation spacing of a given duration. In one example, data bursts are separated by 16 μs of inter-frame-spacing time. This spacing time is fixed irrespective of the data burst size. In addition, each burst also has a preamble that carries no data. With increased data throughput, data bursts are actually being reduced in size, increasing the inefficiency of fixed inter-frame spacing time.

This is illustrated in FIG. 15A which shows data burst sizes and spacings in 802.11ax devices as compared with burst sizes and spacings in an EHT burst. A 2.4 ms burst is used in 802.11ax while a 0.6 ms burst is used in EHT, with the inter-frame spacing remaining the same. In current Wi-Fi technology, the maximum number of frames that can be aggregated together is 256. The maximum size of data frame is 11454 Bytes and thus the maximum throughput of EHT throughput is 40 Gbps (4 times of 802.11ax). It has been determined that there can be up to a 15% minimum airtime efficiency drop for EHT technology if the maximum number of aggregated frames and maximum data frame size are unchanged. This drop could much more significant because most of data frames are not at maximum size. This concept is illustrated in FIG. 15B, showing longer MPDU burst times relative to those in FIG. 15A.

As noted above, multiple MPDUs can be transmitted in one AMPDU. This aggregation is to increase the maximum burst length of Wi-Fi transmissions. In the present technology, to maintain the same airtime efficiency, the maximum number of MPDUs that can be aggregated into one AMPDU is increased by a factor of 4. In one embodiment, the technology increases the number of aggregated frames in one AMPDU to 1024.

Table 1 demonstrates the increase in airtime efficiency provided by this enhancement:

TABLE 1

|  | HE (11ax) | EHT | unit |
| --- | --- | --- | --- |
| Max Ndbps | 130666 | 522664 | bit |
| Min Symbol time | 13.6 | 13.6 | μs |
| Max MPDU size | 11454 | 11454 | Byte |
| Max number of MPDU | 256 | 1024 |  |
| Max size of AMPDU | 23457792 | 93831168 | bit |
| PPDU Burst length | 2442 | 2442 | μs |
| Throughput | 9608 | 38431 | Mb/s |
| GAP (SIFS + BA + SIFS) | 56 | 56 | μs |
| Preamble (SU) | 96 | 100 | μs |
| Airtime Efficiency | 94.14 | 93.99 | % |
| Airtime Efficiency Drop |  | 0.14 | % |

With an AMPDU at 4 times maximum block acknowledge (BA) size, EHT can reach about the same airtime efficiency as 802.11ax at about 94%.

In yet another embodiment, the maximum MPDU size may be increased to 4 times that of 802.11ax. In 802.11x, the MPDU is 11454 Bytes. In the present technology, the MPDU size is increased to 45816 Bytes. Table 2 demonstrates the increase in airtime efficiency provided by this enhancement:

TABLE 2

|  | HE (11ax) | EHT | unit |
| --- | --- | --- | --- |
| Max Ndbps | 130666 | 522664 | bit |
| Min Symbol time | 13.6 | 13.6 | us |
| Max MPDU size | 11454 | 45816* | Byte |
| Max number of MPDU | 256 | 256 |  |
| Max size of AMPDU | 23457792 | 93831168 | bit |
| PPDU Burst length | 2442 | 2442 | us |
| Throughput | 9608 | 38431 | Mb/s |
| GAP (SIFS + BA + SIFS) | 56 | 56 | us |
| Preamble (SU) | 96 | 100 | us |
| Airtime Efficiency | 94.14 | 93.99 | % |
| Airtime Efficiency Drop |  | 0.14 | % |

With this increase in maximum MPDU size, EHT can reach about the same airtime efficiency as 802.11ax at about 94%.

While the technology has advantages relative to 802.11 devices, the concept is applicable to any other burst based wireless communication system. With increased data size and number of aggregated data frames, transmission airtime efficiency is increased, and effective throughput is increased.

In an additional aspect, the technology includes a transmitting and receiving means (110, 170). The transmitting and receiving means includes means for transmitting and receiving on a first data channel (636) having a first operating frequency range interfacing with a first physical data layer via a first physical layer circuit (420, 520) and means for transmitting and receiving on a second data channel (638) having a second, different operating frequency range, and interfacing with a second physical data layer via a second physical layer circuit (421, 521). The transmitting and receiving means includes means for implementing a unitary media access control (MAC) layer (418, 518) interfacing with each of the first and second physical data layer.

In an additional aspect, the technology includes a transmitting and receiving means (110, 170) including means accessing a plurality of frames of a data stream (416, 516). The transmitting and receiving means includes means for scheduling (742) a first portion of the plurality of frames for transmission via a first data channel (636) having a first operating frequency range via a first physical layer circuit (420, 520). The transmitting and receiving means includes means (742) for scheduling a second portion of the plurality of frames for transmission via a second data channel (638) having a second, different operating frequency range, via a second physical layer circuit (421, 521). The transmitting and receiving means includes means (418, 518) for transmitting the plurality of frames via the first data channel and the second data channel, at least some of the first portion of the frames and the second portion of the plurality of frames being transmitted via the first data channel and the second data channel, respectively, at the same time.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A circuit, comprising:
   a host interface; and
   a single media access control (MAC) controller implemented on a processor, the single MAC controller interfacing with each of a first transmit and receive circuitry and a second transmit and receive circuitry,
   the first transmit and receive circuitry that transmits and receives data over a first operating frequency band,
   the second transmit and receive circuitry that transmits and receives the data over a second operating frequency band different from the first operating frequency band; and
   the single MAC controller including a multi-band manager, the multi-band manager directing a first portion of a plurality of data frames received from the host interface to the first transmit and receive circuitry and a second portion of the plurality of data frames to the second transmit and receive circuitry.

2. The circuit of claim 1, wherein the single MAC controller includes a scheduler that determines frames for the first portion and frames for the second portion.

3. The circuit of claim 1, wherein the plurality of data frames is received from the host interface in a sequence, and wherein the multi-band manager further reorders frames out-of-sequence to the first portion and the second portion.

4. The circuit of claim 1, wherein a received plurality of data frames is received from the first transmit and receive circuitry and the second transmit and receive circuitry, the received plurality of data frames having a sequence, and wherein the multi-band manager further reorders any out-of-sequence data frames from the received plurality of data frames back into the sequence.

5. The circuit of claim 1, wherein the single MAC controller alters a frame structure of the plurality of data frames to include a multi-band trigger.

6. The circuit of claim 1, wherein the first operating frequency band is centered on 5 GHz, and wherein the second operating frequency band is centered on 6 GHz, each of the first operating frequency band or the second operating frequency band having a frequency bandwidth band of at least 80 MHz.

7. The circuit of claim 1, wherein each frame in the plurality of data frames comprises a MAC protocol data unit (MPDU) and has a size of 45816 bytes.

8. The circuit of claim 1, wherein a plurality of MPDUs are aggregated and a maximum number of aggregated MPDUs is 1024.

9. A method, comprising:
   accessing a plurality of data frames of a data stream;
   scheduling a first portion of the plurality of data frames for transmission via a first transmit and receive circuitry coupled to a first data channel having a first operating frequency band;
   scheduling a second portion of the plurality of data frames for transmission via a second transmit and receive circuitry coupled to a second data channel having a second operating frequency band different from the first operating frequency band; and transmitting the plurality of data frames via the first data channel and the second data channel, at least some of the first portion of the plurality of data frames and the second portion of the plurality of data frames being transmitted via the first data channel and the second data channel, respectively, at the same time.

10. The method of claim 9, wherein the accessing comprises:
receiving the plurality of data frames from an application; and
prioritizing a subset of the plurality of data frames as more important than others of the plurality of data frames, wherein the scheduling the plurality of data frames via the first data channel and the second data channel is based on priority.

11. The method of claim 9, wherein the plurality of data frames is received in a sequence, and wherein the method further includes:
reordering the plurality of data frames out of sequence, prior to the transmitting.

12. The method of claim 11, wherein the reordering comprises:
reordering physical layer convergence procedure (PLCP) protocol data units (PPDUs).

13. The method of claim 9, wherein the first operating frequency band is centered on 5 GHz, and wherein the second operating frequency band is centered on 6 GHz, each of the first operating frequency band or the second operating frequency band having a frequency bandwidth band of at least 80 MHz.

14. The method of claim 9, further including:
adding a multi-channel trigger to a first data frame of the first portion of the plurality of data frames.

15. The method of claim 9, wherein the accessing comprises:
receiving media access control (MAC) protocol data units (MPDU) having a size of 45816 bytes.

16. A user device, comprising:
a first transmit and receive circuitry that transmits and receives data in a first operating frequency band;
a second transmit and receive circuitry that transmits and receives the data in a second operating frequency band;
a host interface;
a processor implementing a single media access control (MAC) controller between the host interface and each of the first transmit and receive circuitry and the second transmit and receive circuitry; and
a non-transitory computer readable storage medium storing programming, the programming including instructions that, when executed by the processor, cause the single MAC controller to:
receive a plurality of data frames from the host interface;
schedule a first portion of the plurality of data frames for transmission via the first transmit and receive circuitry;
schedule a second portion of the plurality of data frames for transmission via the second transmit and receive circuitry; and
transmit the plurality of data frames via the first transmit and receive circuitry and the second transmit and receive circuitry, at least some of the first portion of the plurality of data frames and the second portion of the plurality of data frames being transmitted via the first transmit and receive circuitry and the second transmit and receive circuitry, respectively, at the same time.

17. The user device of claim 16, the programming further including instructions that, when executed by the processor, cause a scheduler of the MAC controller to:
determine frames for the first portion and frames for the second portion.

18. The user device of claim 16, wherein the plurality of data frames is received from the host interface in a sequence, the programming further including instructions that, when executed by the processor, cause the MAC controller to:
reorder frames out-of-sequence to the first portion and the second portion.

19. The user device of claim 16, the programming including instructions that, when executed by the processor, cause the single MAC controller to:
receive a second plurality of data frames from the first transmit and receive circuitry and the second transmit and receive circuitry, the second plurality of data frames having a sequence; and
reorder any out-of-sequence data frames of the second plurality of data frames back into the sequence.

20. The user device of claim 16, the programming further including instructions that, when executed by the processor, cause the MAC controller to:
include a multi-channel trigger in a first data frame of the first portion of the plurality of data frames.

* * * * *